(12) United States Patent
Doukakis

(10) Patent No.: US 12,518,360 B2
(45) Date of Patent: Jan. 6, 2026

(54) METHOD OF CONVERTING PHOTO IMAGE INTO SKETCH EMBROIDERY

(71) Applicant: DRAWSTITCH INTERNATIONAL LIMITED, Limassol (CY)

(72) Inventor: Ioannis Doukakis, Limassol (CY)

(73) Assignee: DRAWSTITCH INTERNATIONAL LIMITED, Limassol (CY)

( * ) Notice: Subject to any disclaimer, the term of this patent is extended or adjusted under 35 U.S.C. 154(b) by 329 days.

(21) Appl. No.: 18/383,871

(22) Filed: Oct. 25, 2023

(65) Prior Publication Data

US 2024/0144445 A1     May 2, 2024

Related U.S. Application Data

(60) Provisional application No. 63/420,080, filed on Oct. 28, 2022.

(51) Int. Cl.
| | |
|---|---|
| *G06T 5/00* | (2024.01) |
| *G06T 3/40* | (2024.01) |
| *G06T 5/20* | (2006.01) |
| *G06T 5/40* | (2006.01) |
| *G06T 5/70* | (2024.01) |
| *G06V 10/56* | (2022.01) |
| *G06V 10/60* | (2022.01) |

(52) U.S. Cl.
CPC ................ *G06T 5/70* (2024.01); *G06T 3/40* (2013.01); *G06T 5/20* (2013.01); *G06T 5/40* (2013.01); *G06V 10/56* (2022.01); *G06V 10/60* (2022.01); *G06T 2207/10024* (2013.01)

(58) Field of Classification Search
CPC .... G06T 5/70; G06T 3/40; G06T 5/20; G06T 5/40; G06T 2207/10024; G06V 10/56; G06V 10/60
See application file for complete search history.

(56) References Cited

U.S. PATENT DOCUMENTS

| | | | |
|---|---|---|---|
| 8,983,186 B2 * | 3/2015 | Webb | G06T 5/90 |
| | | | 382/167 |
| 11,580,623 B1 * | 2/2023 | Steinberger | G06V 10/44 |

OTHER PUBLICATIONS

NPL: Results Publication Date Range: Feb. 26, 2002 to Mar. 13, 2025.*

* cited by examiner

*Primary Examiner* — Quang N Vo
(74) *Attorney, Agent, or Firm* — John Alumit

(57) ABSTRACT

A photographic image is converted into a monochrome sketch embroidery resulting in more artistic flexibility in creating an embroidery image, resulting in 50% fewer stitches, and making the embroidered article more flexible and comfortable to wear. Software reads an image and resizes it, either down-sampling or up-sampling. If not already in grayscale, the image is converted to grayscale. A Gaussian blur is applied to the gray scale image. Then the image is combined with a color dodge operating formula. A histogram of the resulting image is generated. Then the software locates a low percentile value and a high percentile value within the histogram. The grayscale bitmap is then stretched in accordance with a formula involving the high percentile value and low percentile value. Finally, the software converts the resulting image back to RGB. The final image is used in conjunction with U.S. patent Ser. No. 10/132,018 with certain modifications.

6 Claims, 5 Drawing Sheets

| R | G | B | R | G | B | R | G | B | R | G | B | R | G | B |
|---|---|---|---|---|---|---|---|---|---|---|---|---|---|---|
| 255 | 255 | 255 | 192 | 192 | 192 | 128 | 128 | 128 | 96 | 96 | 96 | 0 | 0 | 0 |
| 192 | 192 | 192 | 128 | 128 | 128 | 96 | 96 | 96 | 0 | 0 | 0 | 44 | 44 | 56 |
| 128 | 128 | 128 | 96 | 96 | 96 | 0 | 0 | 0 | 16 | 16 | 16 | 55 | 66 | 85 |
| 96 | 96 | 96 | 0 | 0 | 0 | 19 | 32 | 16 | 16 | 8 | 16 | 44 | 44 | 56 |
| 0 | 0 | 0 | 64 | 32 | 16 | 96 | 64 | 32 | 64 | 32 | 1 | 16 | 44 | 22 |

FIG. 2

| | | | | |
|---|---|---|---|---|
| 255 | 192 | 128 | 96 | 0 |
| 192 | 128 | 96 | 0 | 45 |
| 128 | 96 | 0 | 16 | 64 |
| 96 | 0 | 26 | 11 | 45 |
| 0 | 39 | 69 | 38 | 33 |

FIG. 3

| 119 | 129 | 88 | 48 | 17 |
|---|---|---|---|---|
| 129 | 135 | 81 | 43 | 26 |
| 88 | 81 | 37 | 26 | 29 |
| 48 | 44 | 28 | 28 | 28 |
| 16 | 26 | 30 | 28 | 19 |

FIG. 4

| 255 | 255 | 195 | 118 | 0 |
|---|---|---|---|---|
| 255 | 255 | 141 | 0 | 50 |
| 195 | 141 | 0 | 18 | 72 |
| 118 | 0 | 29 | 12 | 51 |
| 0 | 43 | 78 | 43 | 36 |

FIG. 5

| 0 | 12 | 18 | 29 | 36 | 43 | 50 | 51 | 78 | 85 | 118 | 141 | 195 | 255 | bin |
|---|----|----|----|----|----|----|----|----|----|-----|-----|-----|-----|-----|
| 5 | 1 | 1 | 1 | 1 | 2 | 1 | 1 | 1 | 1 | 2 | 2 | 2 | 4 | pixel count |
| 5 | 6 | 7 | 8 | 9 | 11 | 12 | 13 | 14 | 15 | 17 | 19 | 21 | 25 | total |
| 20 | 24 | 28 | 32 | 36 | 44 | 48 | 52 | 56 | 60 | 68 | 76 | 84 | 100 | percentile |
| LO | | HI | | | | | | | | | | | | |

FIG. 6

| 255 | 255 | 255 | 255 | 0 |
|-----|-----|-----|-----|---|
| 255 | 255 | 255 | 0 | 255 |
| 255 | 255 | 0 | 255 | 255 |
| 255 | 0 | 255 | 170 | 255 |
| 0 | 255 | 255 | 255 | 255 |

FIG. 7

| R | G | B | R | G | B | R | G | B | R | G | B | R | G | B |
|---|---|---|---|---|---|---|---|---|---|---|---|---|---|---|
| 255 | 255 | 255 | 255 | 255 | 255 | 255 | 255 | 255 | 255 | 255 | 255 | 0 | 0 | 0 |
| 255 | 255 | 255 | 255 | 255 | 255 | 255 | 255 | 255 | 0 | 0 | 0 | 255 | 255 | 255 |
| 255 | 255 | 255 | 255 | 255 | 255 | 0 | 0 | 0 | 255 | 255 | 255 | 255 | 255 | 255 |
| 255 | 255 | 255 | 0 | 0 | 0 | 255 | 255 | 255 | 170 | 170 | 170 | 255 | 255 | 255 |
| 0 | 0 | 0 | 255 | 255 | 255 | 255 | 255 | 255 | 255 | 255 | 255 | 255 | 255 | 255 |

FIG. 8

METHOD OF CONVERTING PHOTO IMAGE INTO SKETCH EMBROIDERY

CROSS-REFERENCE TO RELATED APPLICATION

This present application claims the benefit of Provisional Patent Application No. 63/420,080 filed on Oct. 28, 2022.

FEDERALLY SPONSORED RESEARCH

Not Applicable

SEQUENCE LISTING OR PROGRAM

Not Applicable

BACKGROUND

The current invention involves a method for using a software tool to generate an embroidery out of a bitmap image.

Known is U.S. Pat. No. 10,132,018B2 for a method of converting a photographic image into realistic and customized embroidery using software. The software reads a photographic image, down-sampling or up-sampling so that a single pixel has a specified Density. One Grayscale image is created to calculate derivatives for each pixel using a Sobel operator to calculate the angle and magnitude and stores in a Sobel table. One Color Image is created to materialize and reduce color selection. A series of polylines are calculated to connect same-color pixels using the pixel's angle from the Sobel table. Polylines are reduced to a manageable size first by multiplying all points by Density resulting in stitch data in physical units, and by using a series of rules and formulas involving angles and magnitudes of each pixel from the Sobel table. Commands are appended to an embroidery machine to generate the final embroidery.

U.S. Pat. No. 10,132,018B2, however, requires between 7 to 16 colors in order to function. It would not function, for example, in the case of a monochrome sketch. With the ability to create a sketch, in lieu of a full photorealistic embroidery representation of a photo, a user has more artistic flexibility in creating an embroidery image. Creating a sketch also involves fewer stitches as the user need only create "brush" strokes, which can be generated with a single color (usually black) or a few gray colors. Moreover, the user may still embroider a sketch on delicate fabrics that tend to pucker.

With U.S. Pat. No. 10,132,018B2, it is not likely that a user can embroider an A4 sized image on a t-shirt. To do so, the user would have to either accept puckering and gaps, or would have to place so much backing material such that the embroidery itself would be very hard, which can be uncomfortable to wear. On the other hand, with the present invention, a black and white sketch representation of the same A4 image, would have a quarter of the stitches or less, and the portions to be embroidered in black would be the "brush" strokes and nothing more (assuming the t-shirt were already white). This would result in an embroidered image that would be flexible and more comfortable to wear.

With the current invention, a user would convert a photographic image into a sketch then adjust certain parameters so that less than 50% of the embroidered image has stitches. The method of U.S. Pat. No. 10,132,018B2 would then be used to generate the actual stitching.

SUMMARY

A photographic image is converted into a monochrome sketch embroidery resulting in more artistic flexibility in creating an embroidery image, resulting in 50% fewer stitches, and making the embroidered article more flexible and comfortable to wear. Software reads an image and resizes it, either down-sampling or up-sampling. A single pixel should be close to 0.5 mm, resulting in a photographic image close to 50.8 dots-per-inch (dpi). If not already in grayscale, the image is converted to grayscale. For images in RGB, the pixel weight used is in accordance with CCIR 601A. Gaussian blur is applied to the gray scale image. Then the image is combined with a color dodge operating formula. A histogram of the resulting image is generated. Then the software locates a low percentile value and a high percentile value. The grayscale bitmap is then stretched in accordance with a formula involving the high percentile value and the low percentile value. The high value can be adjusted from $10^{th}$ up to $40^{th}$ percentile to adjust the total brightness of the resulting sketch, with the higher percentile value resulting in a darker sketch with more stretch lines. Finally, the software converts the resulting image back to RGB. The final image is used in conjunction with U.S. Pat. No. 10,132,018 with certain modifications.

DRAWINGS

FIG. 2 illustrates exemplary values for a photographic image close to 50.8 dots-per-inch (dpi)

FIG. 3 illustrates exemplary values for a photographic image represented in FIG. 2 converted to grayscale FIG. 4 illustrates exemplary values for a photographic image represented in FIG. 3 with Gaussian Blur applied FIG. 5 illustrates the values resulting from applying Color Dodge to the photographic images represented in FIGS. 3 and 4.

FIG. 6 illustrates values where a histogram of the image of the values in FIG. 5 is generated with 256 bins. Bins not shown in FIG. 6 are empty (i.e., pixel-count=0), total and percentile equal to the previous bin's value.

FIG. 7 shows values where software "stretches" the grayscale bitmap for each pixel in FIG. 5.

FIG. 8 illustrates the resulting values when the grayscale image represented in FIG. 6 is converted to RGB.

DESCRIPTION

Figure 1:
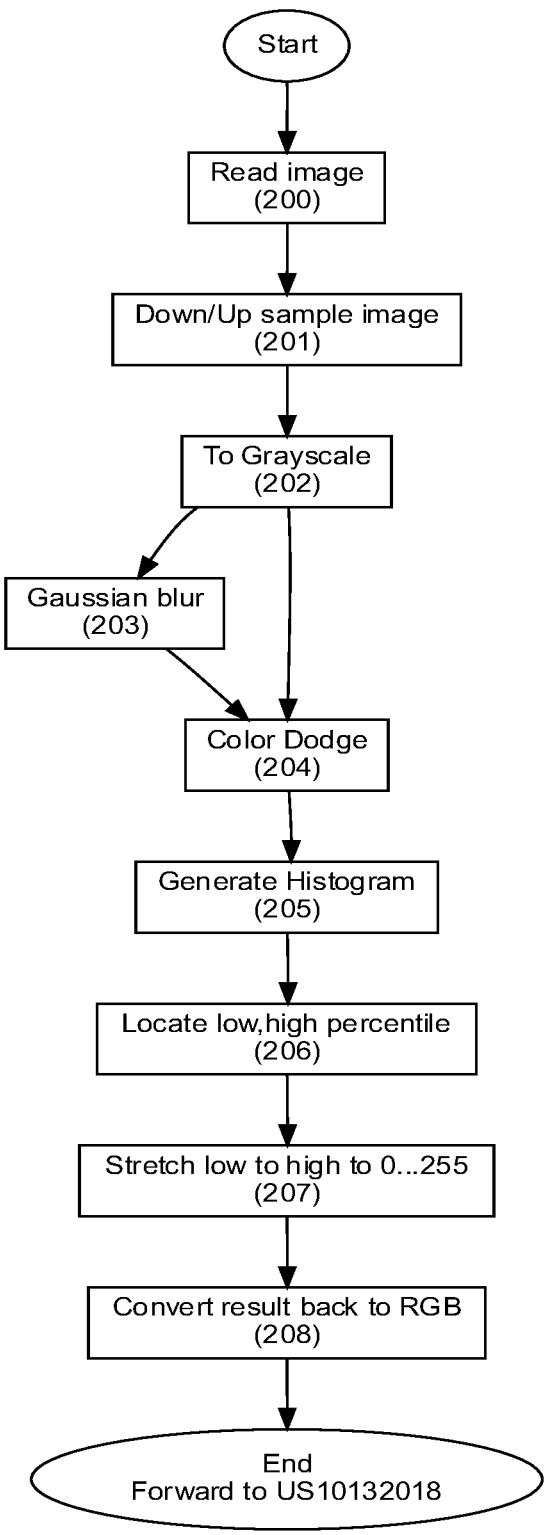
FIG. 1 is a flow diagram of the methodology of the claimed invention

Referring to FIG. 1, computer software reads a photographic image (200) that is pre-stored or captured onto a computer, including a mobile smart phone. The photographic image is resized, down-sampled or up-sampled (201), as needed, so that a single pixel of the image has a predefined size in millimeters (mm), defined as Density. The single pixel should be close to 0.5 mm, resulting in a photographic image close to 50.8 dots-per-inch (dpi) resulting in the values in FIG. 2.

If the image is not already in grayscale (pixels have only a luminance level of 0 . . . 255), it is converted to grayscale (202) resulting in the values in FIG. 3. If the image is in RGB, then the weighting use is in accordance with CCIR 601, where $$Gray\_Value = 0.299 * R\_Value + 0.587 * Green\_Value + 0.114 * Blue\_Value$$

A copy of the image is made and is blurred with Gaussian Blur (203) resulting in the values in FIG. 4. The Gaussian Blur transformation's sigma (σ) value (https://en.wikipedia.org/wiki/Gaussian blur) affects the "brush" size used to generate a sketch, and in our example, goes from 1.0 to 5.0 pixels, a value which is user-defined. The initial/nominal value used by the software is 2.5 pixels.

In FIG. 4, the Gaussian Blur is done at 1 pixel (see gaussian blur 3×3 https://en.wikipedia.org/wiki/Kernel_(image_processing)) given that the example is very small, using the kernel:
1 2 1
2 4 2
1 2 1

Then, the images represented by FIGS. 3 and 4 are combined with an operator known as Color Dodge (204) resulting in the values shown in FIG. 5. In the Color Doge operator formula, f equals a pixel in FIG. 3 and b equals the value of the pixel in the same coordinates in FIG. 4.

```
o  If b!=255 then
o     result = 255*f / 255-b
o  else
o     result = 255
o  if result>255 then result=255
```

A histogram of the image represented in FIG. 5 is generated (205) with 256 bins as shown in FIG. 6. The bins are numbered from 0 ... 255, and each one contains the number of pixels of the image represented by FIG. 4 that have this specific value.

The software locates the bin that is the $1^{st}$ percentile (low value) and the one that is the $25^{th}$ percentile (high value) (206) (https://en.wikipedia.org/wiki/Percentile). The high value of 25 ($25^{th}$ percentile) can be adjusted by the user from $10^{th}$ up to 40th percentile, to adjust the total brightness of the resulting sketch. Increasing the value results in a darker sketch (more sketch lines). In the FIG. 6 example, the low value is 0 and the high value is 18.

Still referring to FIG. 6, assuming that the low value belongs to the "LO" bin and the high percentile value belongs to the "HI" bin, HI should always be greater than LO so that if both percentiles are in the same bin, we assume HI=LO+1.

The software "stretches" the grayscale bitmap (207) in accordance with the rule below, for each pixel (px) of the image represented in FIG. 5 resulting in the grayscale image represented in FIG. 7:

```
o  If px<=lo then
o     img_206_px = 0
o  else if px>=hi then
o     img_206_px = 255
o  else
o     img_206_px = 255*(px - lo)/(hi - lo)
```

Next, the software converts the grayscale image represented in FIG. 7 to RGB (208) by copying the grayscale value of each pixel in FIG. 5 to red, green, and blue values, resulting in the values of an image represented in FIG. 8. The image represented in FIG. 7 can now be utilized in the method of U.S. Pat. No. 10,132,018 as image 100 in said patent, with only certain modifications. There is an instruction sent to step 106 in U.S. patent Ser. No. 10/132,018 not to generate stitches for the RGB white (255,255,255) color. This results in in the Sketch drawing only black and gray brush strokes, and not filling the whole bitmap rectangle with white "paper" stitches. Also, in step 107C of U.S. Pat. No. 10,132,018, the polyline groups are always sorted from dark to light, regardless of the fabric color.

The following are claimed:

1. Method for converting a photographic image into sketch embroidery comprising the following steps:
    a) Computer software reads a photographic image;
    b) Photographic image is resized by down-sampling or up-sampling so that a single pixel of the image has a predefined size in millimeters; said single pixel being approximately 0.5 mm, resulting in a photographic image approximately 50.8 dots-per-inch (dpi);
    c) For images not already in grayscale such that pixels only have a luminance of 0 ... 255, convert the image to grayscale;
    d) For images in RGB, then use pixel weight in accordance with CCIR 601, where:
    GrayValue=0.299*R_Value+0.587*GreenValue+ 0.114*Blue_Value;
    e) Copy resulting image and blur with Gaussian Blur;
    f) Combine resulting blurred image with a Color Dodge operator;
    g) Generate a histogram of resulting image;
    h) Software locates a bin having a low percentile value and a bin having a high percentile value within the histogram, where low percentile value is represented by "lo" and high percentile value is represented by "hi";
    i) Stretch grayscale bitmap of image in accordance with the following rule, where pixel is px and image is img:
    If px<=lo then
    img_px=0
    else if px>=hi then
    img_px=255
    else
    img_px=255*(px−lo)/(hi−lo) and
    j) Software converts resulting grayscale image back to RGB.

2. The method of claim 1, where Guassian blur is done at 1 pixel using the following kernel:
121
242
121.

3. The method of claim 1, where the Color Dodge operator formula is determined as follows, where f equals a pixel in the photographic image converted to gray scale and b equals the value of the pixel in the same coordinates in the photographic image with Gaussian Blur:
If b!=255 then
result=255*f/255−b
else
result=255
if result>255 then result=255.

4. The method of claim 1, where the low value is the $1^{st}$ percentile and the high value is the $25^{th}$ percentile, and said high value can be adjusted from $10^{th}$ up to $4^{th}$ percentile, to adjust the total brightness of the resulting sketch, and where increasing the high value results in a darker sketch with more stretch lines.

5. The method of claim 1, wherein if the low value belongs to the "lo" bin and the high percentile value belongs to the "hi" bin, "hi" is always greater than "lo" so that if both percentiles are in the same bin, assume hi=lo+1.

6. The method of claim 1, wherein the final image is used in conjunction with U.S. Pat. No. 10,132,018 with certain modifications as follows:

a. an instruction is sent to step 106 of U.S. Pat. No. 10,132,018 not to generate stitches for RGB white (255,255,255) color; and
b. in step 107C of U.S. Pat. No. 10,132,018, polyline groups are sorted from dark to light, regardless of fabric color.

\* \* \* \* \*